United States Patent [19]
Arai et al.

[11] Patent Number: 5,297,254
[45] Date of Patent: Mar. 22, 1994

[54] INPUT DEVICE FOR CAD

[75] Inventors: Ryuji Arai, Sapporo; Toru Eshita, Tokyo; Kaoru Niimi, Tokyo; Tatsuyoshi Ikuta, Tokyo; Hiroyuki Furuichi, Tokyo; Tetsuya Iwanaga, Tokyo, all of Japan

[73] Assignee: Mutoh Industries Ltd., Tokyo, Japan

[21] Appl. No.: 737,108

[22] Filed: Jul. 30, 1991

[30] Foreign Application Priority Data

Sep. 26, 1990 [JP] Japan .................................. 2-256539

[51] Int. Cl.⁵ .......................... G06F 15/60; G06F 3/033
[52] U.S. Cl. ..................................... 395/161; 395/143; 345/157; 345/179; 345/162
[58] Field of Search ............... 395/161, 143, 141, 155; 340/709, 718, 719, 724; 345/157, 179, 162, 205, 206, 121, 126

[56] References Cited

U.S. PATENT DOCUMENTS

| | | | |
|---|---|---|---|
| 4,622,641 | 11/1986 | Stephens | 395/141 |
| 4,812,829 | 3/1989 | Ebina et al. | 340/709 |
| 4,855,939 | 8/1989 | Fitzgerald, Jr. et al. | 395/143 X |
| 4,875,033 | 10/1989 | Kato et al. | 340/709 X |
| 4,945,498 | 7/1990 | Mitamura | 395/141 |
| 5,165,015 | 11/1992 | Coggins | 395/155 |

OTHER PUBLICATIONS

EASYCAD Version 1.08 User's Manual, Jun. 1987, pp. 7-10, 54-61, 195-196.

*Primary Examiner*—Raymond J. Bayerl
*Attorney, Agent, or Firm*—Sughrue, Mion, Zinn, Macpeak & Seas

[57] ABSTRACT

A transparent board-like digitizer is placed near a display screen. Images of the same size as that of the digitizer images entered on the digitizer are displayed on the screen. A co-ordinates standard of the digitizer is set to be identical with that of the screen. Thereby, the point indicated on the digitizer of a first cursor device is shown at a position corresponding to that of the point indicated by the cursor. The screen displays right-angle scale lines controlled by a second cursor device on the digitizer. The right-angle scale lines can carry out parallel movements and rotations on the screen. When a straight line drawing is carried out, an operator indicates two points on the digitizer by means of the first and the second cursor devices and inputs the data of such two points, whereby a straight line connecting these two points, dimension supplemental lines in parallel with the right-angle scaling lines, dimension lines extending between the two points, and a dimension figure, respectively, are displayed on the screen.

2 Claims, 12 Drawing Sheets

INPUT DEVICE FOR CAD

BACKGROUND OF THE INVENTION

The present invention relates to a drawing co-ordinates input device used in a computer-aided-designing and drawing system or CAD.

Japan Patent Laid-open No. 62-59329 shows a conventional co-ordinates input device constructed by assembling a position detective tablet or a digitizer and a display device so as to display patterns or shapes on the display device.

Such a conventional co-ordinates input device provided with an integrated assembly of the digitizer and the display device fails to have a size indication function. Consequently, it is the purpose of the present invention to provide an input device for CAD of a type of an integrated assembly of the digitizer and display device provided with a size indication function.

SUMMARY OF THE INVENTION

An input device used for computer-aided-designing of an apparatus functioning to draw patterns or shapes on a screen of a display device by casting a scene of the display device on a drawing board-like digitizer, making the indication position of a first cursor device on the digitizer agreed with the indication position displayed on the display device on the digitizer, and inputting the positional signal to a control apparatus by means of the first cursor device. The input device for CAD comprises a means for displaying right angle scale lines in a screen of the display device, a second cursor device for controlling right angle scale lines formed differently from the first cursor device, a control means for moving parallely and revolving the right angle scale lines by output signals from the second cursor device, a dimension calculating means for calculating a dimension value between the first measurement point indicated by a center point of the right angle scale lines and the second measurement point indicated by the cursor device, a dimension drawing means for creating respective indication data of dimension auxiliary lines in parallel to an axis of ordinate of the right angle lines and a dimension line corresponding to the data of two points, using the two points data of the first measurement point and the second measurement point, as well as creating indication data of dimension values from the output of the dimension calculating means in order to write dimension indication data, such as these dimension values, dimension auxiliary lines, and dimension lines and etc. in a data base, and a display indication means for displaying the dimension indication data of the data base on the screen of the display device.

DESCRIPTION OF THE FIGURES

FIG. 11 is still another block diagram of the operation of the input device for CAD.

DESCRIPTION OF THE PREFERRED EMBODIMENT

The structure of the present invention will be described in detail with reference to its embodiment shown in the accompanying drawings.

Figure 12:
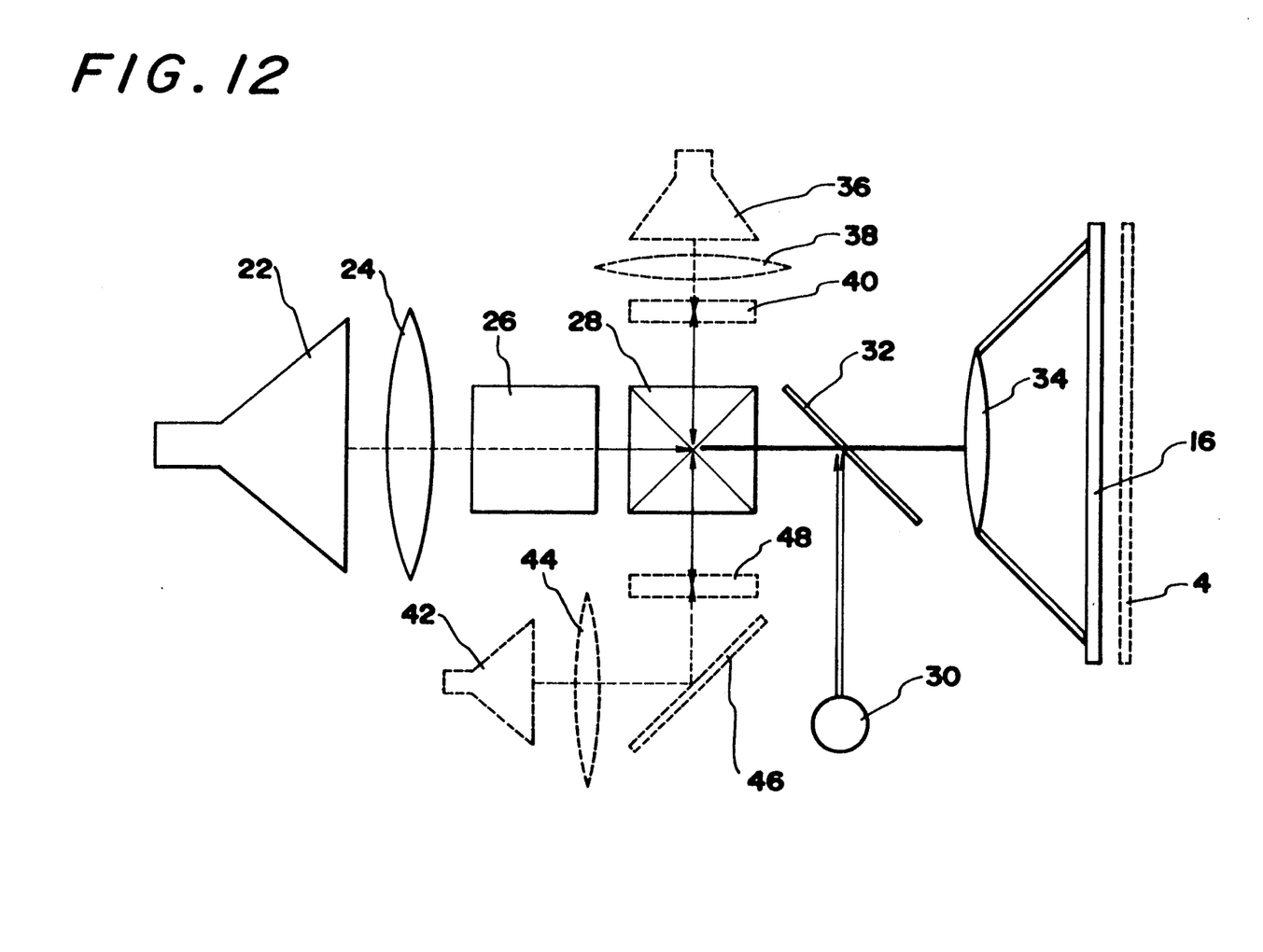
FIG. 12 is a schematic view of a construction of the input device for CAD.
Figure 13:
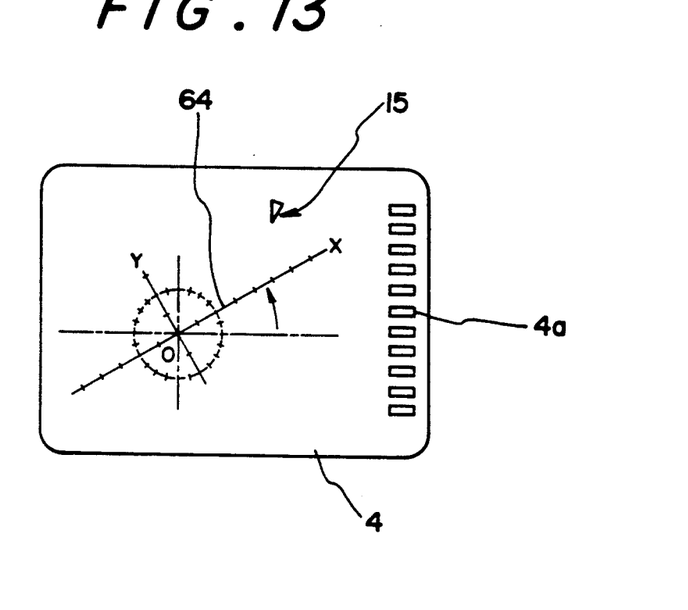
FIG. 13 is an explanation view of a function of the input device for CAD.
Figure 14:
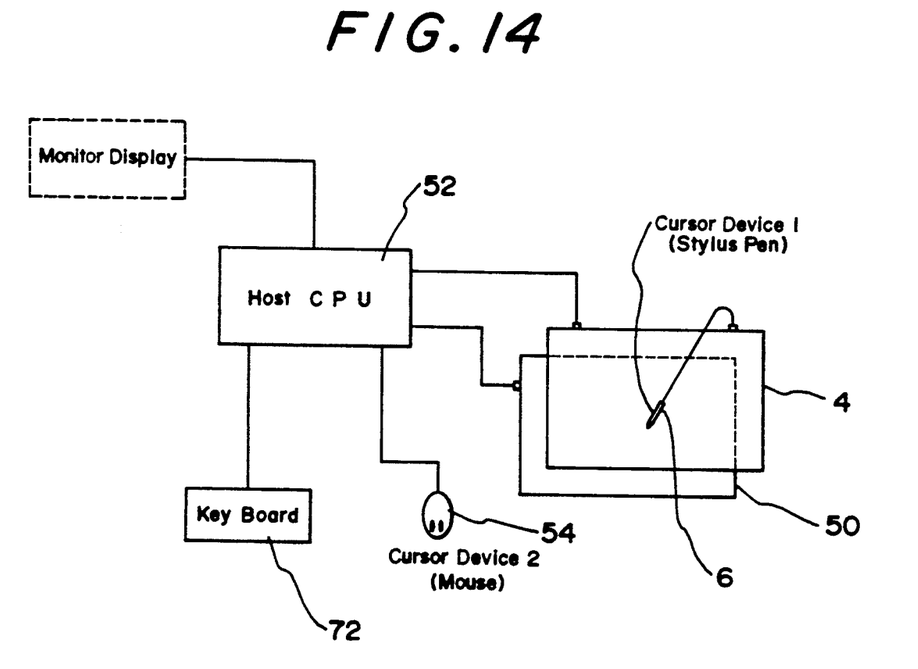
FIG. 14 is a block diagram of a function of the input device for CAD.
Figure 15:
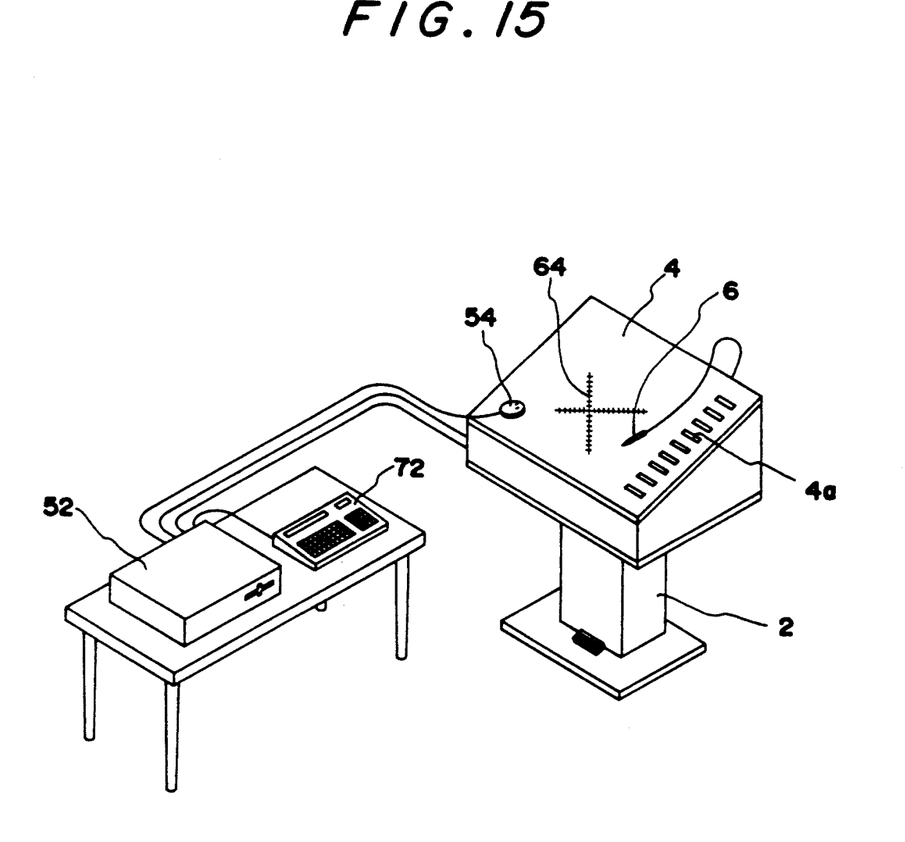
FIG. 15 is a perspective view of the whole structure of the input device for CAD.

As shown in FIG. 15, a drafting desk 2 has a supporting frame and a transparent tablet type digitizer 4 is supported on the frame. The digitizer 4 is set to have the same size as that of an ordinary drafting board and has a flat face like a drafting board. According to the digitizer 4, when an absolute type cursor device 6, such as a stylus pen, connected to a control apparatus (not shown) of the digitizer 4 is used by an operator to indicate a point on the digitizer 4, an absolute co-ordinates signal of the point indicated is translated to paper co-ordinates data through a driver 8 and a co-ordinates translation means 10 shown in FIG. 11 and the translated data is supplied to a cursor pattern generator 12. The paper co-ordinates data means real data plane co-ordinates used as a standard of a drafting program. The cursor pattern generator 12 supplies cursor pattern data to a co-ordinates translation means 14. The co-ordinates translation means 14 translates cursor pattern data to display co-ordinates data and supplies them to a display driver 17, so that a cursor 15 corresponding to the indication position situated on the digitizer 4 of the cursor device 6 is displayed on the screen of the display device and the cursor 15 (see FIG. 13) is displayed or indicated on a screen 16 (see FIGS. 11, 12) through a projector 50. When a front end of the cursor device 6 comes into contact with the surface of the digitizer 4 making a hit, the positional co-ordinates data of the cursor device 6 is supplied to a drafting program means 18. Consequently, the drafting program means 18 outputs drafting data according to a drafting command position signal indicated or selected previously by the cursor device 6 from a command menu. The drafting data is translated into the display co-ordinates data by means of a co-ordinates translation means 20 and the data is supplied to a display driver 16, so that a pattern according to the drafting program is displayed. The drafting command can be called out by indicating a command menu region 4a (see FIG. 13) of the digitizer 4. The screen 16 is set as to have substantially the same size as that of the digitizer 4 and situated near the rear face of the digitizer 4. As shown in FIG. 12, a display device 22 consists of a cathod ray tube of green color, and a lens 24, a light valve 26, and a polarized prism 28 are arranged in front of the display device 22.

The light valve 26 translates images entered from one side of the light valve 26 into clear images and shines the clear images to its other side. The construction and principle of the light valve 26 is disclosed in U.S. Pat. No. 3,723,651 and U.S. Pat. No. 4,343,535, so there is no detailed description of the valve herein. A co-operative operation of the light valve 26 and the input of a xenon lamp 30 translates the image of the display device 22 into a clear image, thus the clear image is shone to the polarized prism 28. The image shone to the polarized prism 28 is enlarged and projected on the screen 16 through a half mirror 32 and a lens 34. A display device 36 consists of a cathod ray tube for red color, a lens 38 and a light valve 40 are arranged in front of a screen face of the display device 36. The light valve 40 faces the polarized prism 28. A display device 42 consists of a cathod ray tube for blue color, and a lens 44, a reflection mirror 46, and a light valve 48 are situated in front of the screen of the display device 42. The light valve 48 faces the polarized prism 28. These lenses 28, 38, 44 light valve 26, 38, 48, lamp 30, polarized prism 28, half mirror 32, and reflection mirror 46 construct a reflection type enlarging projection mechanism or projector for enlarging and projecting an image on the screens of the display devices 22, 36, 42 on the screen 16. An enlarging rate of the enlarging projection mechanism is determined so as to make the position the cursor device 6 indicated on the digitizer 4 and the position of the cursor 15 on the screen 16 fixed by the co-ordinates signal of the previous position agree. The screen 16 and the projector 50 are contained in the box or console of the drafting stand 2. The digitizer 4 and these display devices 22, 36, and 42, respectively are connected to a control apparatus 52 consisting of a host CPU. A cursor device 54 is an increment type having a mouse and outputting movement distance, and connected to a driver 56 (see FIG. 11).

Apparently, the driver 56 is connected to a changed-length value.changed-angle value translation means 60 and a co-ordinates translation means 58 through a pair of switch contacts a, b. Changing-over of the switch contacts a and b can be done by operating a switch key of the cursor device 54. A cursor pattern generator 62 indicates right angle scale lines 64 having the graduation shown in FIG. 13. The right angle scale lines 64 are adapted to change the angle according to a content of a cursor parameter table 66. The cursor pattern generator 62 is connected to a display driver 17 through a co-ordinates change means 68. 72 is a key board. The cursor pattern parameter table contains therein various data of positional co-ordinates, angle of the origin or cross point of the right angle scale lines 64, X-axis length and Y-axis length of line pattern, and graduation width.

An operation of the system above will be described.

Figure 16:
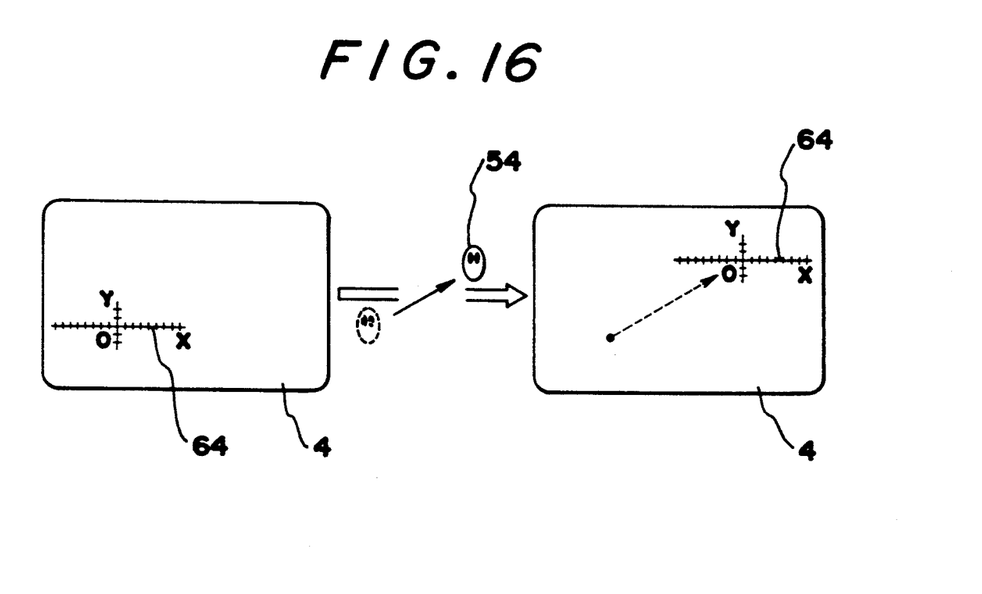
FIG. 16 is an explanation of an operation of the input device for CAD.
Figure 17:
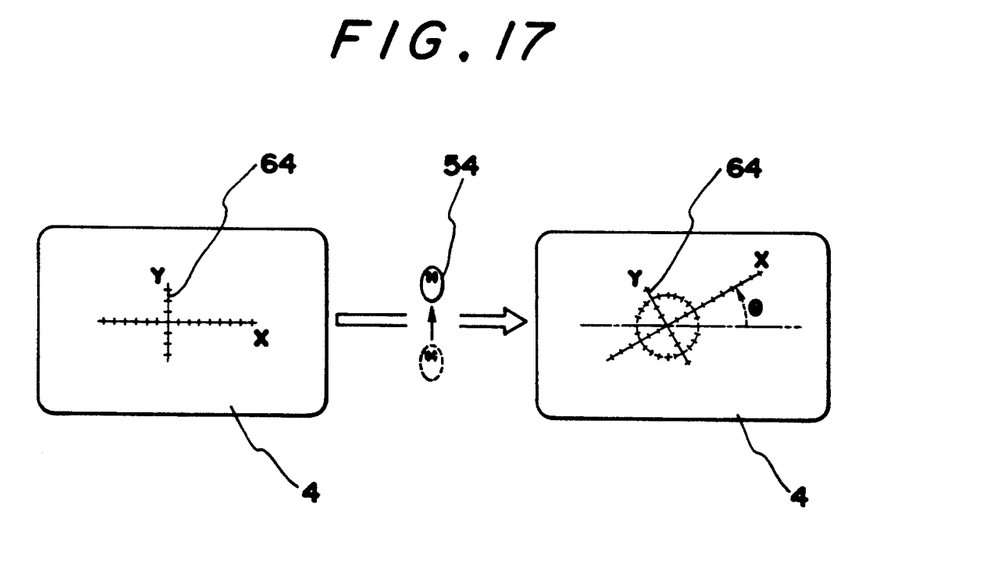
FIG. 17 is another explanation of the operation of the input device for CAD according to the present invention.

A right-angle scale line 64 displayed on the screen 16 can be operated by the cursor device 54. When no key of the cursor device 54 is pressed, the switch 70 is kept in a condition of being connected to the (a) contact. When the cursor device 54 is moved along an XY direction on the digitizer 4 or other table's plane face, output change values of $\Delta x$ and $\Delta y$ of the cursor device 54 is translated as they are into a parallel movement of the origin position of the right angle scale lines 64 and is indicated as shown in FIG. 16. When the mouse key of the cursor device 54 is pressed, the switch 70 is in contact with contact (b). When the cursor device 54 is moved along the XY direction on the table plane face while pressing the mouse key, the change or translation means 60 picks up length change value of $\Delta y$ or $\Delta x$ of the cursor device 54 in order to change linearly these change value of $\Delta y$ or $\Delta x$ to an angle $\Delta \theta$ using a function $f(\Delta y)$. The angle change value $\Delta \theta$ is added to the angle $\theta$ at present on parameter table 66. The cursor pattern generator 62 rotates the right angle scale lines 64 by a volume for the angle $\theta$ according to the content of the parameter table 66 and it is indicated on the screen 16 as shown in FIG. 17. The angle $\theta$ of the right angle scale line 64 is shown on the screen 16 by the drafting programming means 18. While, the operator indicates a command region 4a on the digitizer 4 by the front end of the cursor device 6 in order to order, for example, a green straight line command to the drafting program means 18 of the control apparatus 52 indicating two points A and B on the digitizer 4 through the front end of the cursor device 6, consequently a drafting co-ordinates signal of the two points A and B is inputted into the drafting program means 18. The control apparatus 52 generates drafting data on the basis of inputted co-ordinates signal and the drafting data is translated into display co-ordinates data through the co-ordinates change means 20, controlling the display apparatus 22 on the basis of the co-ordinates data. Consequently, a straight line AB is shown on the screen of the display device 22 on the basis of XY co-ordinates axes (screen co-ordinates) of the image face. The image on the screen of the display device 22 is projected toward the polarized prism 28 through the light valve 26, and the image on the screen is enlarged and projected on the screen 16 through the polarized prism 28, the half mirror 32, and the lens 34. Both the origin points of the XY co-ordinates standards of this enlarged projected image and of the digitizer 4 agree with each other, as well as the standards of XY axis length agree with each other in 1:1. As a result, when the operator indicates points A and B on the digitizer 4 through the cursor device 6, a green straight line connecting two points A and B indicated is shown in real time and real size on the digitizer 4. Using the same procedure, red and blue and other colors of straight lines, circles, and points can be drafted at the position indicated on the digitizer.

Data inputted into the control apparatus 52 is stored in a treatment device of the apparatus 52 before being outputted on a XY plotter. Drafting is done through the cursor device watching the right angle scale line 64 on the screen 16. The right angle scale line 64 corresponds to a right angle scale or a pair of straight rulers installed on a head of the universal parallel ruler device, and the cursor device 6 corresponds to a writing instrument. The operator manipulates the cursor device 54 to carry out parallel movement and angle change of the right angle scale line 64 in a manner of the manipulation of the head of the universal parallel ruler device, and the other cursor device 6 to draft a drawing. It is apparent from the above explanation that the cursor pattern generator 62 is means for displaying right angle scale lines on the screen of the display device, and the cursor parameter table 66, the changed length value.changed angle value translation means 60 and the cursor pattern generator 62 is a control means for moving in parallel and rotating the right angle scale line 64 on the screen 16. Although the scene of the display device is projected on the screen 16 through the enlarge projecting mechanism 50 according to the structure above, a display device having a display of the same size as the digitizer 4 may be arranged below digitizer 4.

Figures 8, 9:
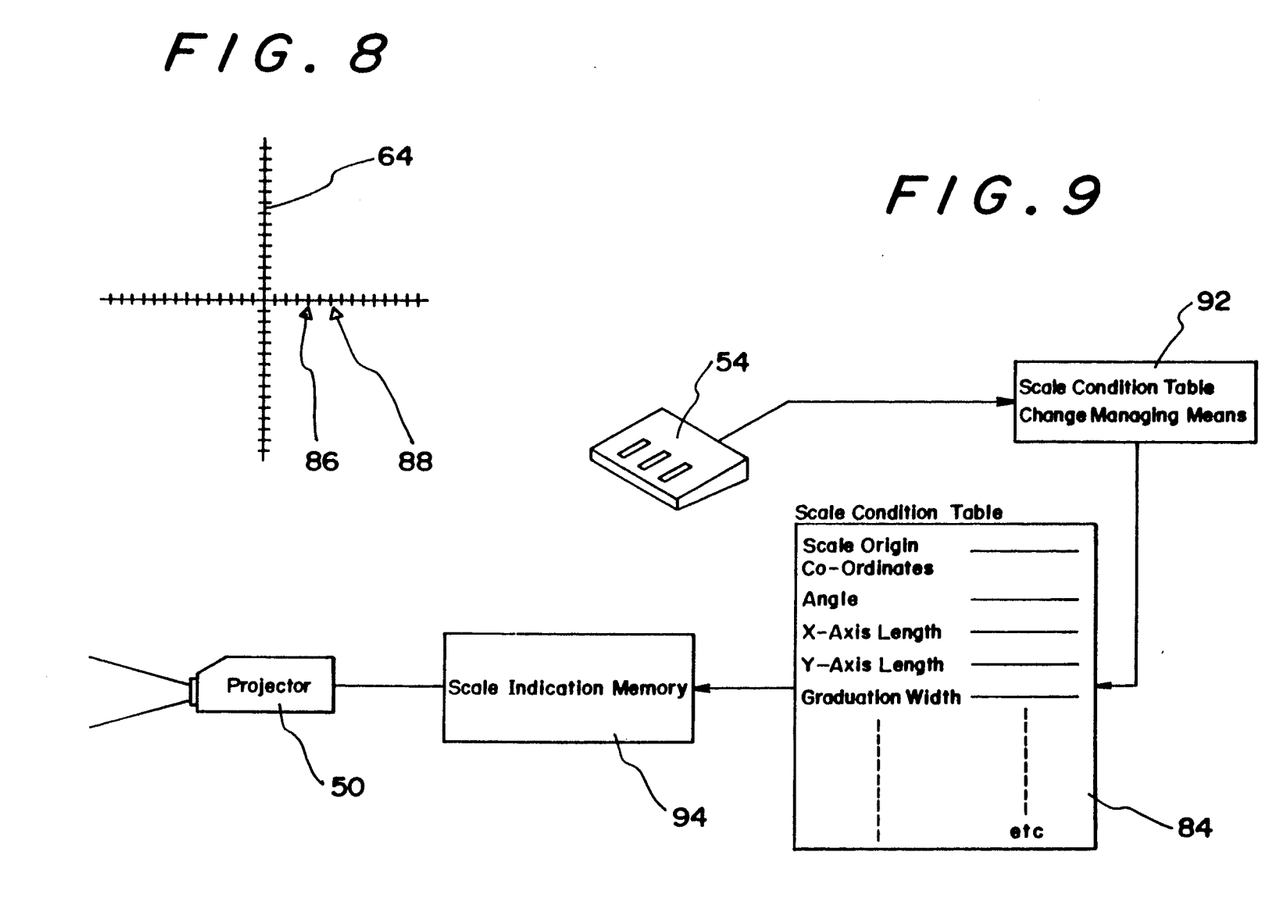
FIG. 8 is an explanation of the co-ordinates.
FIG. 9 is a block diagram of the function of the input device for CAD.

A parallel movement function of the right angle scale line will be described in detail with reference to FIG. 9.

An incremental co-ordinates signal from the cursor device 54 is sent to a scale condition table change managing means 92 through a contact (a) of the switch 70 (see FIG. 11). The managing means 92 sequentially replaces or newly writes the co-ordinates of the origin point of the right angle scale line 64 of the scale condition table 84 corresponding to the cursor parameter table 66 shown in FIG. 11 according to changes of the co-ordinates signal of the cursor device 54. The contents of the scale condition table 84 are read out on the scale indication memory 94 and the right angle scale 64 is displayed on the screen 16 through the screen of the display device and the projector 50. The origin and the center point of the right angle scale line 64 are replaced by new origin and point according to the change in the output from the cursor device 54, thus the right angle scale line 64 moves in parallel on the screen 16.

Next, the rotation control function of the right angle scale line will be described in detail with reference to FIG. 10.

Figure 5:
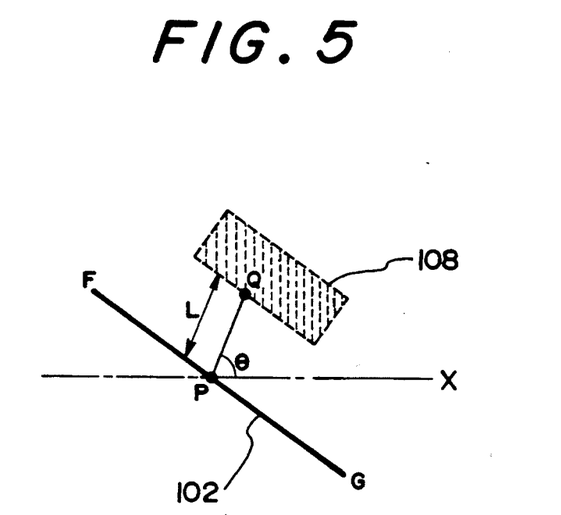
FIG. 5 is a still another explanation of the operation of the input device for CAD.
Figure 6:
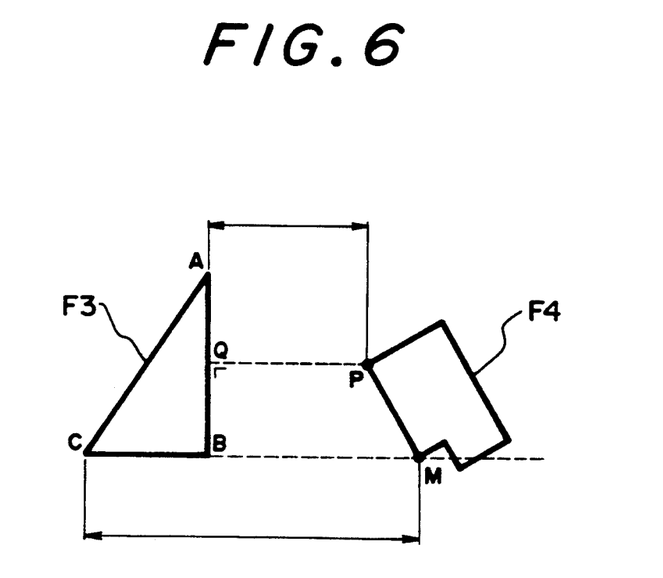
FIG. 6 is a still another explanation of the operation of the input device for CAD.
Figure 10:
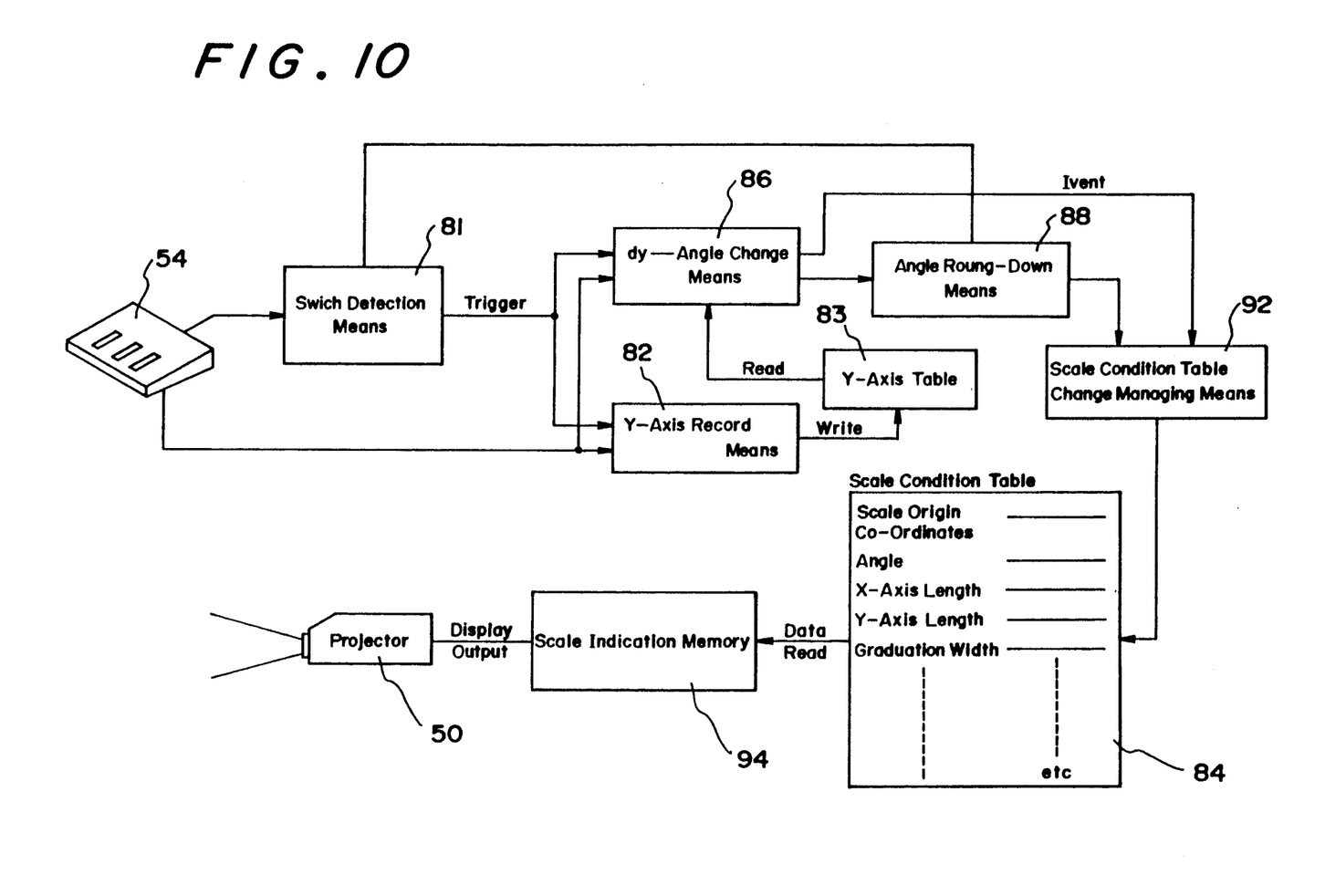
FIG. 10 is another block diagram of the operation of the input device for CAD according to the present invention.

The switch detection means 81 shown in FIG. 10 corresponds to the switch 70, and the angle change means 86, y-axis table 83, y-axis recording means 82, scale condition table change managing means 92, respectively correspond to the changed length value.-changed angle value translation means 60 shown in FIG. 5. An angle rounding-down means 88 is used to accomplish the minimum unit angle rounding-down function which is not shown in FIG. 11. The means 88 rounds down the angle signal from the angle change means 86 by the minimum unit and outputs the resultant to the scale condition table change managing means 92. For example, when the minimum unit of angle is 0.5 degree and the range change means 86 outputs angle from 0 to 5 degree, the angle rounding-down means 88 receives signals from the angle change means 86 outputting angle signals of 0.0, 0.5, 1.0, 1.5, 2.0, 2.5, 3.0, 3.5, 4.0, 4.5, 5.0.

When the angle changing mouse key of the cursor device 54 is turned ON, the resultant signal from the mouse key is detected by the switch detection means 80 outputting a trigger signal which sets the angle change means 86 and the y-axis recording means 82 in an operative condition. The co-ordinates output of Y-axis component of the XY co-ordinates output from the cursor device 54 is supplied to the y-axis recording means 82 and the angle change means 86 when the mouse key is turned ON. The Y-axis component co-ordinates output is written on the y-axis table 83. The angle change means 86 picks up the change value of the Y-axis component co-ordinates output and translates this change value to an angle value. The angle signal outputted from the angle change means 86 is inputted into the angle round-down means 88 rounding-down the angle signal to the minimum unit angle, and the resultant angle is supplied to the scale condition table change managing means 92. While, an event signal of ordinal angle change mode for changing angles from the angle change means 86 is supplied to the scale condition table change managing means 92. The scale condition table change managing means 92 replaces old angle data of the scale condition table 84 by new data of the table 84 on the basis of an outputted angle signal from the angle round-down means 88. This new angle data of the right angle scale 64 is read out in the right angle scale line display memory 94 and the content of the memory 94 is displayed on the screen of the display device, as well as on the screen 16 through the projector 50.

Figure 7:
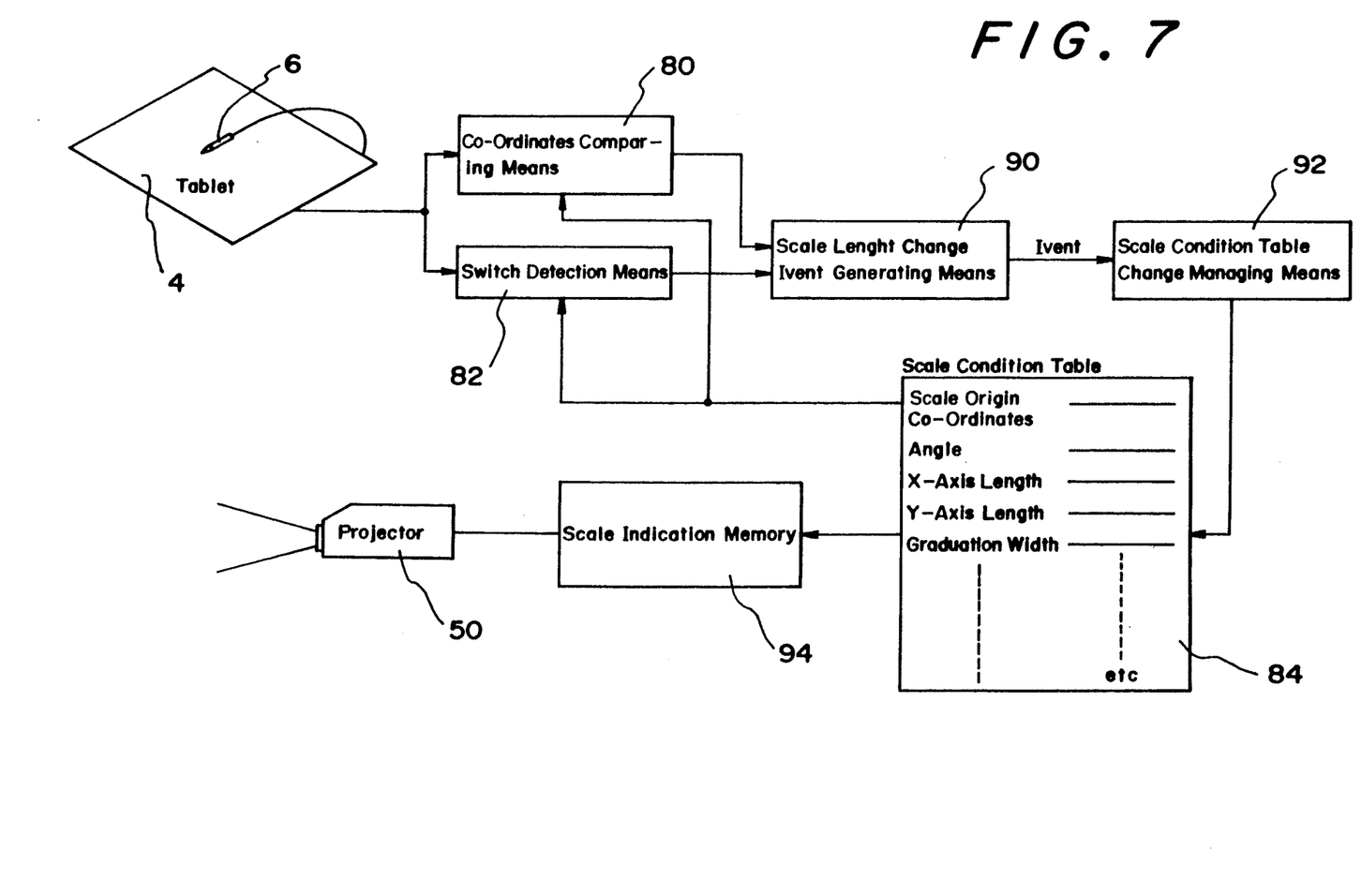
FIG. 7 is a block diagram of the operation of the input device for CAD.

The construction of the scale length change means will be described in detail with reference to FIG. 7.

A co-ordinates comparing means 80 and the switch detection means 82 are connected to the digitizer 4 for outputting the position signal of the cursor device 6. As described above, the scale condition table corresponding to the cursor parameter table 66 contains such data as a center point, angle, X-axis length, Y-axis length, and graduation width of the right angle scale lines 64. Near the center point of the right angle scale lines 64 on the digitizer 4, expandable switch indications 86 and 88 are seen as shown in FIG. 8. The indication corresponds to the command shortening the line length of the right angle scale lines 64. The co-ordinates comparing means 80 reads out data of the center point and the angle data of the right angle scale lines 64 from the scale condition table 84 in order to recognize the position of the center point of the right angle scale lines 64 on the digitizer 4, as well as recognize the positions of the expandable switch indications 86 and 88 relative to the right angle scale line 64. Hitting the indication 88 through the cursor device 6 by the operation, the hit signal is detected by the switch detection means 82. The position signal determined by making the X-axis line and the Y-axis line and the center point of the right angle scale line 64 its standard is inputted to the scale length change event generating means 90. The event generating means 90 recognizes a hitting of the indication 88 by the outputs of the co-ordinates comparing means 80 and of the switch detection means 82, and inputs an extended event signal to the scale condition table. The table change managing means 92 inputs a scale length data replacing signal into the scale condition table 84 on the basis of the extended event signal and rewrites the data of the X-axis length and the Y-axis length of the table 84 along data extendable direction. The extended value of the data of the scale length is determined by a length of hit on the indication 88 by the cursor device 6. The X-axis and Y-axis lengths data rewritten of the right angle scale line 64 are read out in the right angle scale lines indication memory 94. As a result, the content of the memory 94 is displayed on the screen of the display device, as well as on the screen 16 through the projector 50. When the indication 86 is hit by the cursor device 6, the data of X-axis and Y-axis lengths of the scale condition table 84 are rewritten to their shrinking direction and the rewritten data is displayed on the screen 16.

The size indication means of the present invention will be briefly explained with regard to FIG. 1 to FIG. 6.

Figure 1:
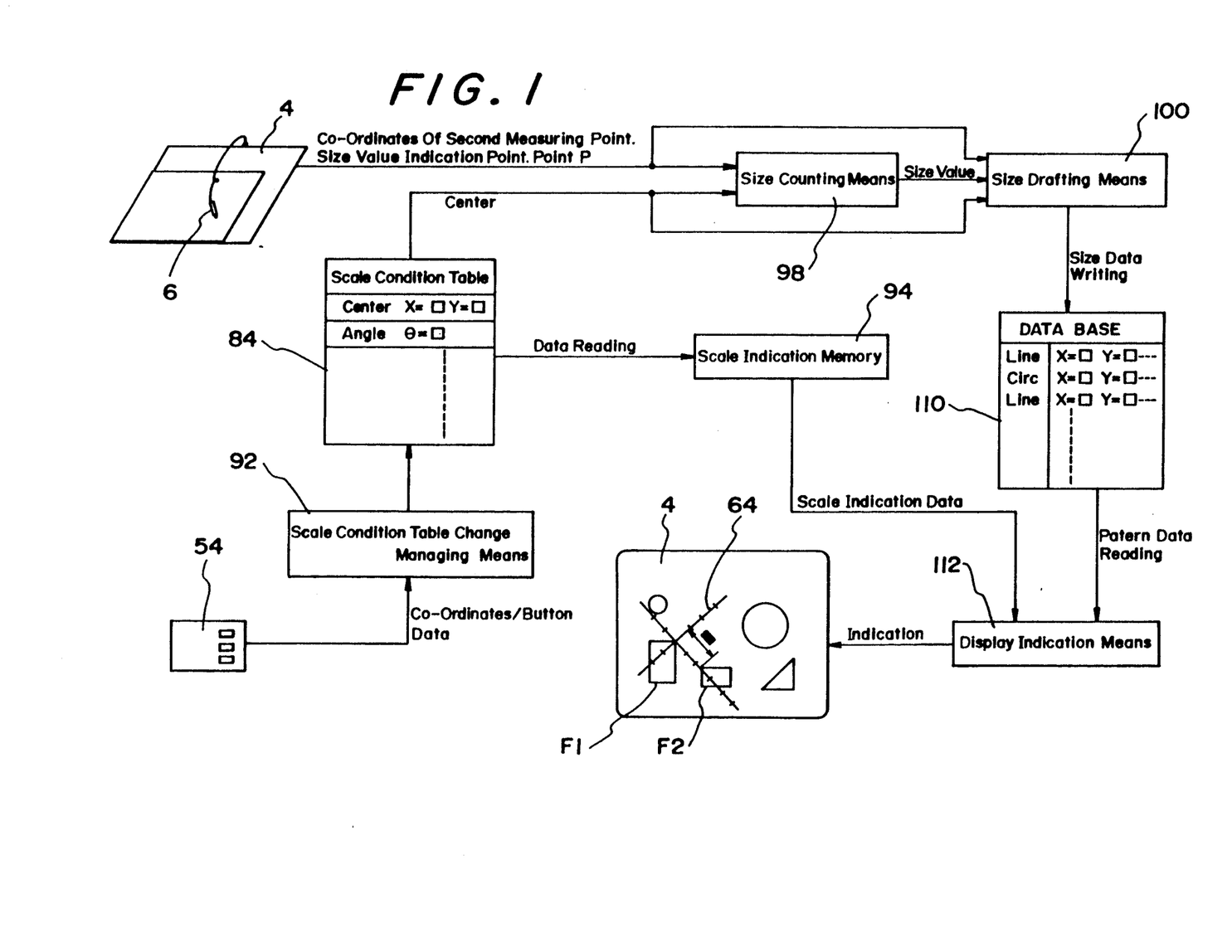
FIG. 1 is a block diagram of the input device for CAD according to the present invention.
Figure 2:
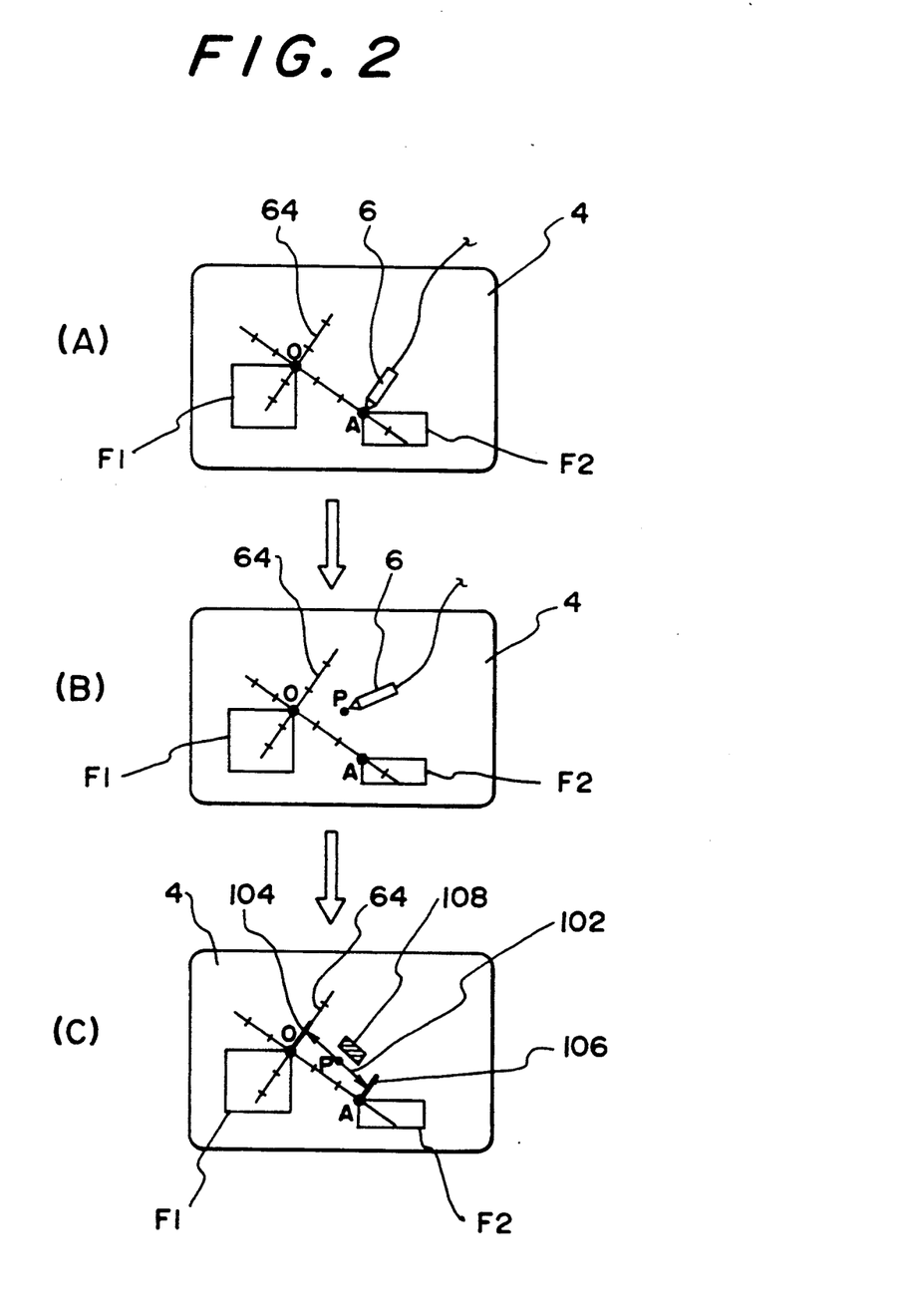
FIG. 2 is an explanation of functions of the input device for CAD.

First, how to indicate a dimension line between two points O and A of a pattern displayed on a digitizer 4 as shown in FIG. 2(C) will be explained.

Operating a cursor device 54, the point O of right angle scale lines 64 is made to agree with a measurement point of the pattern F1 as shown in FIG. 2(A), naming it the first measurement point. A co-ordinates signal of the cursor device 64 is outputted from a scale condition table change and management means 92 in order to write a center point data and the like of a scale line in a scale condition table 84. The data of the center point O of the right angle scale lines 64 or a co-ordinates data of the first measurement point are read out from the scale condition table 84 and inputted to an input end at an end of a size calculating means 98. Next the operator uses a cursor device 6 to hit a point A of a pattern F2 on the digitizer 4 naming it the second measurement point. It is noted that another cursor device 54 is operated so as to place the point A on an axis of abscissa or transversal line of the right angle scale lines 64 rotating the right angle scale lines 64 as shown in FIG. 2. Next, the operator hits an indication point P indicating a position of the dimension figure and a dimension on the digitizer 4 by means of the cursor device 6. A co-ordinates data of the indication point P and data of the second measurement point are inputted to another input end of the size or dimension calculating means 98. The dimension calculating means 98 calculates a dimension figure between two points O and A using a present scale (scale standard) and the dimension figure is outputted to a dimension drawing means 100. The dimension drawing means 100 creates a dimension data consisting of a dimension line 102 passing through the point P in parallel to a line between two points O and A, dimension auxiliary lines 104 and 106 passing through two points O and A in parallel to an axis of ordinate of the right angle scale line 64, and a dimension value 108 positioned near the indication point P in parallel to the dimension line 102, by using data of inputted dimension value and data of the first measurement point O, the second measurement point A, and the indication point P. The created dimension data is written to a data base 110. The dimension data written in the data base 110 is read out on a display indication means 112 and shown in a screen 16 below the digitizer 4 as shown in FIG. 2(C). The display indication means 112 consists of display devices 22, 36, 44, a projector 50, and a screen 16.

Figure 3:
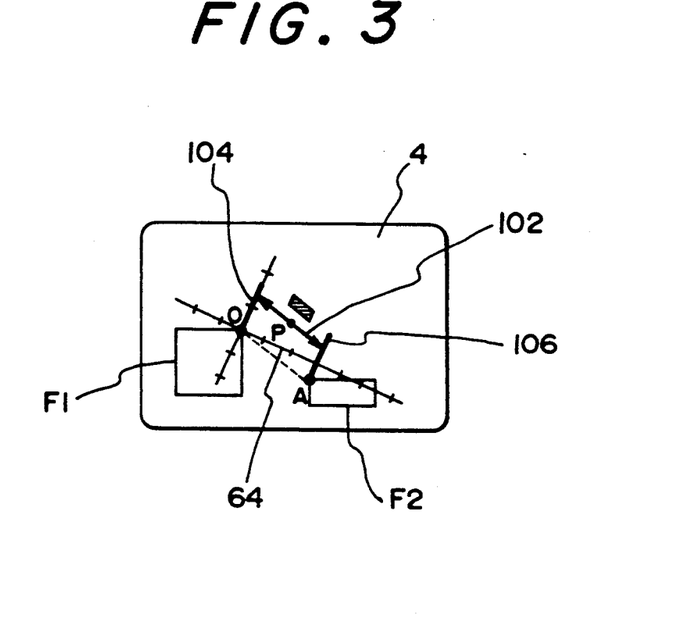
FIG. 3 is another explanation view of the operation of the input device for CAD.

When a point A does not exist on the right angle scale lines 64 as shown in FIG. 3 and a dimension display is carried out, a dimension line 102 is displayed so as to be in parallel to two points O and A and dimension auxiliary lines 104, 106 are displayed in parallel to the axis of ordinate or vertical line of the right angle scale line 64.

A concrete method of displaying dimensions on the screen will be explained.

In order to indicate a dimension line passing through the point P in parallel to two points O and A, the right angle scale lines 64 initializes an angle $\theta$ (FIG. 4) of the axis of ordinate of the right angle scale lines 64 relative to a X-axis on the screen 16 and a center point O of the right angle scale lines 64, and the cursor device 6 initially sets data of these points A and P. The dimension calculating means 98 determines the dimension between two points from the first and the second measurement points O and A, obtaining a dimension value of 108. The dimension drawing means 100 determines end points F and G of the dimension line 102 passing through the indication point P. Also the dimension drawing means 100 determines a dimension indication position Q near the indication point P. Write-in data of the dimension auxiliary lines 104 and 106 from the points O and A are inputted to the data base 110 in order to indicate dimension auxiliary lines 104 and 106 on the screen 16 and input the data of the dimension line 102 between points F and G and the points P, and the dimension value 108 to the data base 110, indicating the dimension 102 on the screen 16 and the dimension value 108 near the point P.

A determining method of the co-ordinates of the end points F (XF, YF), G (XG, YG) will be explained.

Figure 4:
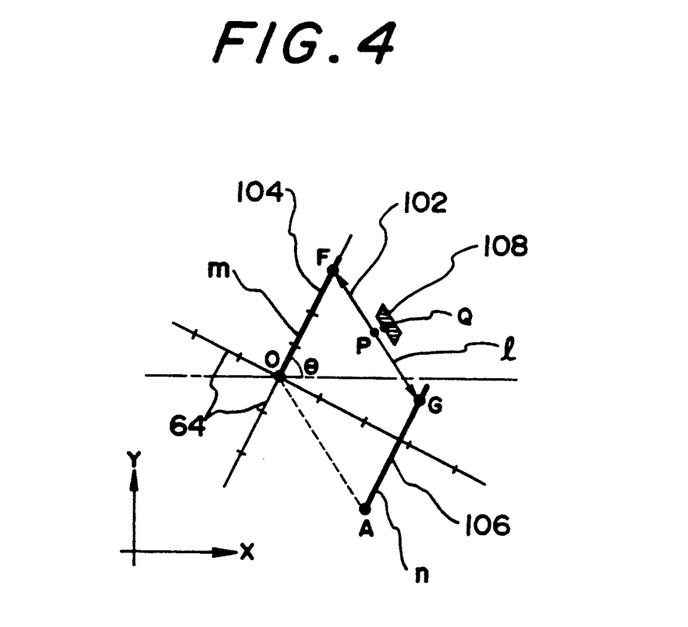
FIG. 4 is a still another explanational view of the operation of the input device for CAD.

Presuming lines of FG, OF, and AG l, m, and n, l has $y = ax + b$ m has $y = \tan \theta \cdot x + c$ n has $y = \tan \theta \cdot x + d$ as shown in FIG. 4, a gradient T relative to two points O and A is presumed to $T = (YO - YA)/(XO - XA)$, obtaining an equation $a = T$.

b is determined by the straight line l and point P obtaining $b = B$.

Similarly, c and d are determined by the line m and the point O, line n and point A, obtaining equations $c = C$, $d = D$ Thus, l is $y = Tx + B$ m is $y = \tan \theta \cdot x + C$ and n is $y = \tan \theta \cdot x + D$ Consequently, F (XF, YF) is determined by a crossing point of the lines l and m, and G (XG, YG) is obtained by a crossing point of the lines l and n.

Next, how to determine the co-ordinates of the dimention indication position Q (XQ, YQ) near the point P will be explained.

As illustrated in FIG. 5, presuming the distance between P and Q a predetermined distance L, Q (XQ, YQ) is determined from the value of the point P (XP, YP) using the following equation.

$$(XQ, YQ) = (X_p + L \cos \theta, Y_p + L \sin \theta)$$

According to the embodiment above of the present invention, the right angle scale line 64 functions as a guide and it is very convenient to indicate the measurement point. For example, with regard to the patterns F3 and F4 shown in FIG. 6, in order to indicate the dimension from the point P to the point Q determined by extending a line from the point P making a right angle to a line AB, the axis of ordinate of the right angle scale lines 64 is made agreed with the line AB making the axis of abscissa passes through the point P, in order to hit these points P and Q. Seeing and recognizing an existence of the point M on an extension of the line CB in FIG. 6, the axis of abscissa of the right angle scale lines 64 is made agreed with the line CB in order to indicate the dimension CM, the existence of the point M on the line is recognized to hit the points C and M. Because the dimension auxiliary lines 104 and 106 are set in parallel to the axis of ordinate of the right angle scale lines 64, a rotation of the right angle scale lines 64 indicates dimension auxiliary lines of any angle relative to the measurement point.

As described above, according to the present invention, right angle scale lines displayed on the digitizer are used to indicate dimensions and sizes, so it is possible to use the right angle scale lines as a guide means, so a dimension indication operation can be very conveniently done. In addition, the dimension auxiliary lines are set in parallel to the right angle scale lines, so it is possible to effectively indicate or display dimension auxiliary lines having any angle to the measurement point by rotating the right angle scale lines.

What is claimed is:

1. A CAD input device for drawing patterns on a screen of a display device by superposing a scene of the display device on a drawing board-like digitizer, making the indication position of a first cursor device on said digitizer correspond with the indication position shown on the display device on the digitizer, and inputting a positional signal to a control apparatus by means of the first cursor device, said CAD input device comprising a means for displaying right angle scale lines on a screen of the display device, a second cursor device which is separate from the first cursor device, for controlling the right angle scale lines, a control means for moving in parallel and rotating the right angle scale lines using output signals from the second cursor device, a dimension calculating means for calculating a dimension value between a first measurement point indicated by a center point of the right angle scale lines and a second measurement point indicated by said first cursor device, a dimension drawing means for creating respective indication data of dimension auxiliary lines in parallel to an ordinate axis of said right angle scale lines and a dimension line corresponding to the data of two points using the data of said first measurement point and the dimension value from the output of said dimension calculating means, wherein said indication data includes dimension values, dimension auxiliary lines, and dimension lines, in a data base, and a display indication means for displaying the dimension indication data of the data base on the screen of the display device.

2. The CAD input device according to claim 1, wherein when the first cursor device indicating said second measurement point indicates the indication position of a dimension, the dimension drawing means creates indication data of a dimension line passing through the indication position of a dimension and which extends parallel to the line between said first and said second measurement points and the dimension drawing means also creates dimension value indication data which is displayed near said indication position of a dimension.

* * * * *